(12) United States Patent
Lee et al.

(10) Patent No.: US 10,642,410 B2
(45) Date of Patent: May 5, 2020

(54) TOUCHSCREEN CONTROLLER, TOUCHSCREEN SYSTEM INCLUDING THE SAME, AND OPERATING METHOD OF THE TOUCHSCREEN CONTROLLER

(71) Applicant: Samsung Electronics Co., Ltd., Suwon-si, Gyeonggi-do (KR)

(72) Inventors: Kyung-Hoon Lee, Seoul (KR); Michael Choi, Seoul (KR)

(73) Assignee: SAMSUNG ELECTRONICS CO., LTD., Samsung-ro, Yeongtong-gu, Suwon-si, Gyeonggi-do (KR)

(*) Notice: Subject to any disclaimer, the term of this patent is extended or adjusted under 35 U.S.C. 154(b) by 136 days.

(21) Appl. No.: 15/927,352

(22) Filed: Mar. 21, 2018

(65) Prior Publication Data

US 2019/0095031 A1    Mar. 28, 2019

(30) Foreign Application Priority Data

Sep. 25, 2017    (KR) .......................... 10-2017-0123657

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0414* (2013.01); *G06F 2203/04106* (2013.01); *G06F 2203/04112* (2013.01)

(58) Field of Classification Search
CPC ...... G06F 3/0414; G06F 3/0416; G06F 3/044; G06F 2203/04106; G06F 2203/04112
See application file for complete search history.

(56) References Cited

U.S. PATENT DOCUMENTS

| 8,274,481 | B2 | 9/2012 | Nishimura et al. |
| 8,519,974 | B2 | 8/2013 | Berggren |
| 8,780,074 | B2 | 7/2014 | Castillo et al. |
| 8,890,841 | B2 | 11/2014 | Rebeschi et al. |
| 8,947,277 | B2 | 2/2015 | Lee et al. |
| 9,086,439 | B2 | 7/2015 | Erdogan et al. |
| 9,329,739 | B2 | 5/2016 | Jang |
| 2013/0215053 | A1 | 8/2013 | Lin et al. |
| 2015/0097583 | A1 | 4/2015 | Gao |
| 2016/0041217 | A1 | 2/2016 | Lee et al. |
| 2016/0124544 | A1 | 5/2016 | Kang et al. |

FOREIGN PATENT DOCUMENTS

KR    10-1378345 B1    3/2014

*Primary Examiner* — Stacy Khoo

(74) *Attorney, Agent, or Firm* — Muir Patent Law, PLLC

(57) ABSTRACT

A touchscreen controller includes a first sample-and-hold (S/H) block configured to sample a plurality of capacitive touch inputs in response to a first sampling signal and to output samples of the sampled capacitive touch inputs in response to first output control signals, a second S/H block configured to sample a plurality of force touch inputs in response to a second sampling signal independent of the first sampling signal and to output samples of the sampled force touch inputs in response to second output control signals, and an analog-digital converter (ADC) shared by the first and second S/H blocks and configured to convert the samples of the capacitive touch inputs and the samples of the force touch inputs into digital signals.

20 Claims, 15 Drawing Sheets

TOUCHSCREEN CONTROLLER, TOUCHSCREEN SYSTEM INCLUDING THE SAME, AND OPERATING METHOD OF THE TOUCHSCREEN CONTROLLER

CROSS-REFERENCE TO RELATED APPLICATION

This application claims the benefit of Korean Patent Application No. 10-2017-0123657, filed on Sep. 25, 2017, in the Korean Intellectual Property Office, the disclosure of which is incorporated herein in its entirety by reference.

BACKGROUND

The inventive concept relates to a touchscreen controller, and more particularly, to a touchscreen controller for sensing capacitive touches and force touches, a touchscreen system including the same, and an operating method of the touchscreen controller.

A touchscreen system detects an approach or contact of an object on a touchscreen panel including sensing electrodes and provides touch information based on the detection. The touch information may include a location of a touch on the touchscreen panel. A conventional touchscreen system may provide information about not only the location of the touch but also a force of the touch, as the touch information. As such, an electronic device having such a touchscreen system may provide various responses to the touch of a user, based on the location and force of the touch.

As a touchscreen system can provide various types of touch information, various types of signals sensed by the touchscreen panel need to be processed. Conventional touchscreen systems may include an analog-digital converter (ADC) for converting analog signals sensed by the touchscreen panel into digital signals that has a large area. An increase in number of ADCs can also increase the size and power consumption of a semiconductor chip for implementing a touchscreen controller.

SUMMARY

The inventive concept provides a touchscreen controller capable of reducing the size and power consumption of a semiconductor chip, a touchscreen system including the same, and an operating method of the touchscreen controller.

Some embodiments provide methods including sampling a plurality of capacitive touch inputs from a touchscreen and storing samples of the capacitive touch inputs in a first sample-and-hold(S/H) block responsive to a first sampling signal, sequentially providing the samples of the capacitive touch inputs stored in the first S/H block to an analog-digital converter (ADC) responsive to first output control signals, sampling a plurality of force touch inputs from the touchscreen and storing samples of the force touch inputs in a second S/H block responsive to a second sampling signal, and sequentially providing the samples of the force touch inputs stored in the second S/H block to the ADC responsive to second output control signals.

In some embodiments, a touchscreen controller includes a first sample-and-hold (S/H) block configured to sample a plurality of capacitive touch inputs in response to a first sampling signal and to output samples of the sampled capacitive touch inputs in response to first output control signals, a second S/H block configured to sample a plurality of force touch inputs in response to a second sampling signal independent of the first sampling signal and to output samples of the sampled force touch inputs in response to second output control signals, and an analog-digital converter (ADC) shared by the first and second S/H blocks and configured to convert the samples of the capacitive touch inputs and the samples of the force touch inputs into digital signals.

In further embodiments, a touchscreen system includes a touchscreen panel comprising a plurality of capacitive sensing electrodes configured to sense capacitive touches and a plurality of force sensing electrodes configured to sense force touches, and a touchscreen controller electrically connected to the capacitive sensing electrodes through a plurality of first channels and to the force sensing electrodes through a plurality of second channels. The touchscreen controller includes a first sample-and-hold (S/H) block configured to generate and store samples of a plurality of capacitive touch inputs received through the first channels responsive to a first sampling signal, a second S/H block configured to generate and store samples of a plurality of force touch inputs received through the second channels responsive to a second sampling signal, an analog-digital converter (ADC) shared by the first and second S/H blocks and configured to convert the stored samples of the capacitive touch inputs and the force touch inputs into digital signals, and a control signal generator configured to generating the first sampling signal and the second sampling signal.

BRIEF DESCRIPTION OF THE DRAWINGS

Embodiments of the inventive concept will be more clearly understood from the following detailed description taken in conjunction with the accompanying drawings in which.

DETAILED DESCRIPTION

Hereinafter, the inventive concept will be described in detail by explaining some embodiments of the inventive concept with reference to the attached drawings.

Figure 1:
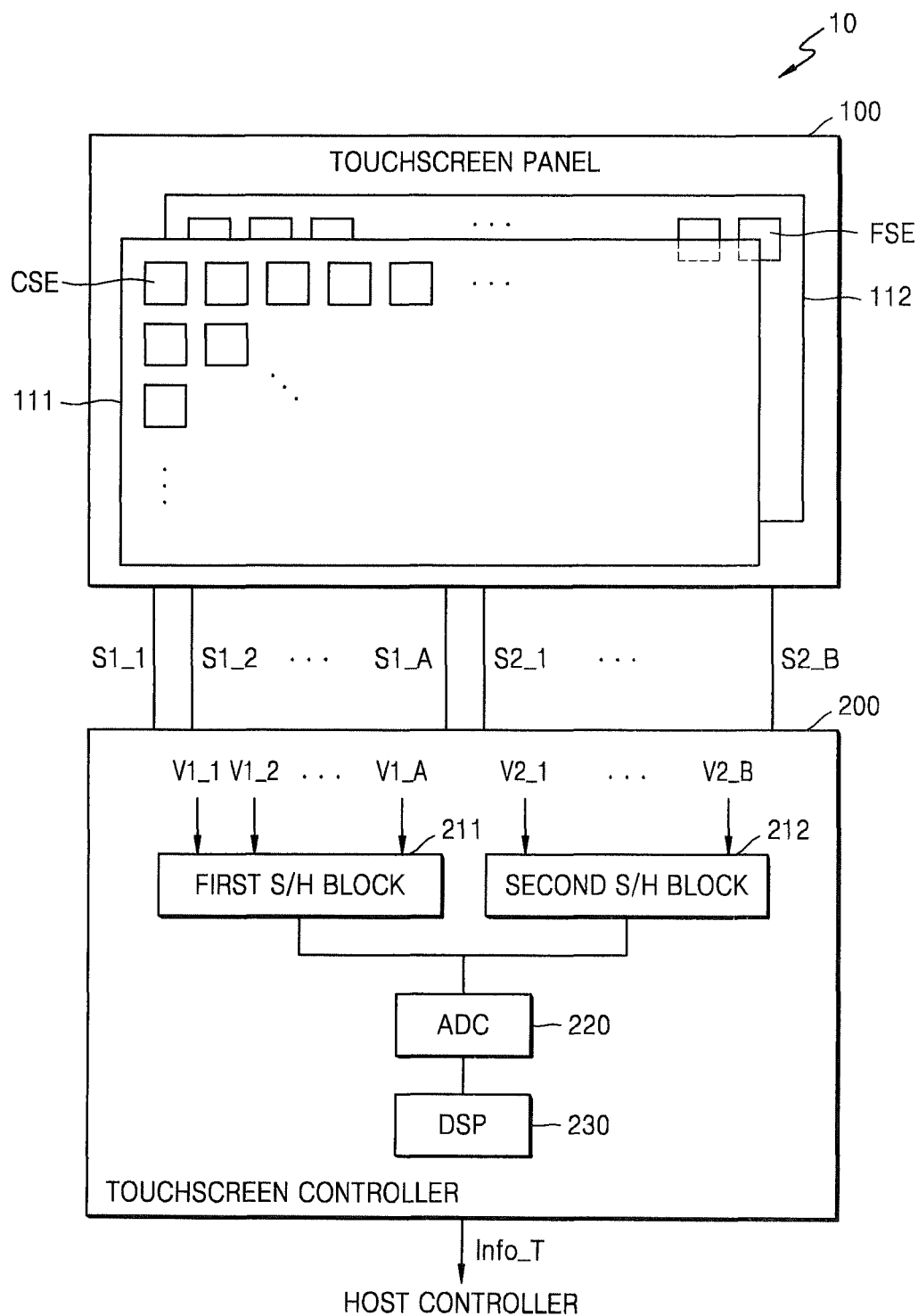
FIG. 1 is a block diagram of a touchscreen system according to some embodiments of the inventive concept.

FIG. 1 is a block diagram of a touchscreen system 10 according to some embodiments of the inventive concept. Referring to FIG. 1, the touchscreen system 10 may include a touchscreen panel 100 and a touchscreen controller 200. The touchscreen panel 100 may include a first electrode layer 111 for sensing capacitive (or capacitance) touches, and a second electrode layer 112 for sensing force touches.

The first electrode layer 111 may include a plurality of capacitive sensing electrodes CSEs, and the second electrode layer 112 may include a plurality of force sensing electrodes FSEs. Although FIG. 1 shows that the first and second electrode layers 111 and 112 are provided on different levels, embodiments of the inventive concept are not limited thereto. For example, the first and second electrode layers 111 and 112 may be provided on the same level. In addition, although FIG. 1 shows that the first electrode layer 111 is located on the second electrode layer 112, the first electrode layer 111 may be located under the second electrode layer 112.

The capacitive sensing electrodes CSE and the force sensing electrodes FSE may be made of a transparent conductive material such as indium tin oxide (ITO), indium zinc oxide (IZO), or indium tin zinc oxide (ITZO). The capacitive sensing electrodes CSE may be arranged in a matrix on the first electrode layer 111. When a touch (e.g., an approach or contact) of an object (or a conductive object) such as a finger, touch pen, or stylus pen is made on the touchscreen panel 100, a capacitance is generated between the object and the capacitive sensing electrode CSE provided at a location where the touch is made. The touchscreen controller 200 may apply an alternating-current signal to the capacitive sensing electrode CSE, and detect a variation in a sensing capacitance Cs due to the touch by analyzing a sensed signal output from the touchscreen panel 100.

The force sensing electrodes FSE may also be arranged in a matrix on the second electrode layer 112. According to some embodiments, additional electrodes (not shown) for sensing a force of the touch may be further provided on the touchscreen panel 100, and the force of the touch may be detected by sensing a variation in a capacitance between the force sensing electrodes FSE and the additional electrodes due to the touch. However, the above-described operations are merely examples, and the capacitive sensing operation and the force sensing operation may be performed based on various other methods.

In an embodiment, the touchscreen panel 100 may be an in-cell type panel in which the capacitive sensing electrodes CSE are coupled to display pixels, and the capacitive sensing electrodes CSE may include one or more elements of the display pixels, e.g., one of source driving lines, gate lines, anode pixel electrodes, and cathode pixel electrodes. In some embodiments, the capacitive sensing electrodes CSE may serve as common electrodes for applying a common display voltage. However, embodiments of the inventive concept are not limited thereto and the touchscreen panel 100 may be an on-cell type panel in which the capacitive sensing electrodes CSE are provided on a display panel. In some embodiments, the capacitive sensing electrodes CSE may be provided on a substrate (or glass) other than the display panel. The touchscreen panel 100 may be implemented as a liquid crystal display (LCD), light emitting diode (LED) display, organic LED (OLED) display, active-matrix OLED (AMOLED) display, flexible display, or another type of flat panel display.

The touchscreen controller 200 may apply a driving signal to the touchscreen panel 100, and generate touch information Info_T by analyzing a sensed signal which varies based on various types of touches. For example, the touchscreen controller 200 may detect whether a touch is made and a location of the touch by sensing a variation in a capacitance of the capacitive sensing electrodes CSE. The touchscreen controller 200 may further detect a force of the touch by sensing a variation in a capacitance of the force sensing electrodes FSE. The touchscreen controller 200 may generate the touch information Info_T including various types of information, e.g., the location and force of the touch, based on the detection result. The touch information Info_T may be provided to an external host controller.

According to some embodiments, the touchscreen controller 200 may be connected to the touchscreen panel 100 through a plurality of channels. For example, the touchscreen controller 200 may receive a plurality of first sensed signals $S1\_1$ to $S1\_A$ through a plurality of (e.g., A) first channels connected to the capacitive sensing electrodes CSE. In addition, the touchscreen controller 200 may receive a plurality of second sensed signals $S2\_1$ to $S2\_B$ through a plurality of (e.g., B) second channels connected to the force sensing electrodes FSE.

The touchscreen controller 200 may include an analog front end (AFE), and the first sensed signals $S1\_1$ to $S1\_A$ and the second sensed signals $S2\_1$ to $S2\_B$ may be processed in the AFE. For example, the AFE may include a voltage reading circuit (not shown), amplification circuit (not shown), integration circuit (not shown), etc. In the embodiments of FIG. 1, a first sample-and-hold (S/H) block 211 and a second S/H block 212 may be included in the AFE. In addition, in the embodiments of FIG. 1, an analog-digital converter (ADC) 220 may be further included in the AFE. According to some embodiments, the ADC 220 may be provided outside the AFE. Furthermore, as illustrated in FIG. 1, the touchscreen controller 200 may further include a digital signal processor (DSP) 230 for generating the touch information Info_T by processing a digital signal output from the ADC 220.

Input signals provided to the first and second S/H blocks 211 and 212 may be generated based on operations of various circuits in the AFE. For example, capacitive touch inputs $V1\_1$ to $V1\_A$ may be generated by processing the first sensed signals $S1\_1$ to $S1\_A$, and force touch inputs $V2\_1$ to $V2\_B$ may be generated by processing the second sensed signals $S2\_1$ to $S2\_B$.

The first S/H block 211 may sample the capacitive touch inputs $V1\_1$ to $V1\_A$ and store the sampled capacitive touch inputs $V1\_1$ to $V1\_A$. In addition, the first S/H block 211 may provide the capacitive touch inputs $V1\_1$ to $V1\_A$ to the ADC 220 based on an output control operation. The first S/H block 211 may include a plurality of first S/H circuits, e.g., A first S/H circuits corresponding to the A capacitive touch inputs $V1\_1$ to $V1\_A$. According to some embodiments, each first S/H circuit may include a switch for performing the sampling operation, a storage circuit for storing a corresponding capacitive touch input, and a switch for performing the output control operation.

Similarly, the second S/H block 212 may sample the force touch inputs $V2\_1$ to $V2\_B$ and store the sampled force touch inputs V2_1 to V2_B. In addition, the second S/H block 212 may provide the force touch inputs V2_1 to V2_B to the ADC 220 based on an output control operation. The second S/H block 212 may include a plurality of second S/H circuits, e.g., B second S/H circuits corresponding to the B force touch inputs V2_1 to V2_B. According to some embodiments, each second S/H circuit may include a switch for performing the sampling operation, a storage circuit for storing a corresponding force touch input, and a switch for performing the output control operation.

The ADC 220 may receive the capacitive touch inputs V1_1 to V1_A and the force touch inputs V2_1 to V2_B from the first and second S/H blocks 211 and 212, convert the same into digital signals, and provide the digital signals (or digital-converted touch inputs) to the DSP 230. The DSP 230 may generate the touch information Info_T by processing the digital signals.

As the ADC 220 is shared by the first and second S/H blocks 211 and 212, the ADC 220 may process touch inputs based on various touch schemes. That is, a single ADC 220 may be shared by the A S/H circuits included in the first S/H block 211 and the B S/H circuits included in the second S/H block 212, and the capacitive touch inputs V1_1 to V1_A and the force touch inputs V2_1 to V2_B may be sequentially processed by the single ADC 220.

AFE operations for sensing capacitive touches and sensing force touches may be independently (or asynchronously) performed. For instance, the first and second S/H blocks 211 and 212 may independently operate. According to some embodiments, the first S/H block 211 may sample the capacitive touch inputs V1_1 to V1_A in response to a first sampling signal, and the second S/H block 212 may sample the force touch inputs V2_1 to V2_B based on a second sampling signal. For example, the first sampling signal for sampling the capacitive touch inputs V1_1 to V1_A based on a capacitive touch scheme and the second sampling signal for sampling the force touch inputs V2_1 to V2_B based on a force touch scheme may be asynchronously generated.

Since capacitive sensing and force sensing may be independently performed, a timing for sampling the capacitive touch inputs V1_1 to V1_A and a timing for sampling the force touch inputs V2_1 to V2_B may be separately controlled. When the first and second S/H blocks 211 and 212 are controlled based on a common sampling signal, the sampling signal may be asserted to sample the force touch inputs V2_1 to V2_B while the ADC 220 is processing the capacitive touch inputs V1_1 to V1_A, and the sampled data stored in some S/H circuits of the first S/H block 211 may be lost before being converted into digital signals. Thus, not all of the capacitive touch inputs V1_1 to V1_A may be converted into digital signals. In some embodiments, the meaning that the sampling signal may be asserted may be expressed as or may include the meaning that the sampling signal is activated so that the sampling operation is activated.

In contrast, according to some embodiments of the inventive concept, the first sampling signal may selectively control only the first S/H block 211, and the second sampling signal may selectively control only the second S/H block 212. In addition, even when the sampling signal is asserted to sample the force touch inputs V2_1 to V2_B while the capacitive touch inputs V1_1 to V1_A are being converted into digital signals, the capacitive touch inputs V1_1 to V1_A stored in the first S/H block 211 may be retained, and subsequently the capacitive touch inputs V1_1 to V1_A may be normally converted into digital signals.

According to the afore-described embodiments of the inventive concept, since touch inputs based on various touch schemes may be processed by the common ADC 220, the number of ADCs 220 included in the touchscreen controller 200 may be reduced, and thus the size and power consumption of a semiconductor chip for implementing the touchscreen controller 200 may be reduced.

Although the embodiments of FIG. 1 show capacitive touches and force touches, embodiments of the inventive concept are not limited thereto. For example, various other schemes capable of sensing a contact of an object on the touchscreen panel 100 may be applied in some embodiments of the inventive concept. In some embodiments, the touchscreen controller 200 may further include an additional S/H block to process another sensing result. In this case, the additional S/H block may be controlled based on an additional sampling signal, and the above-described ADC 220 may be further shared by the additional S/H block.

In the afore-described embodiments, a capacitive touch input may include a touch input made by a finger of a user and thus may be referred to as a finger touch input (or a finger input), and a force touch input may be referred to as a 3D touch input.

Figure 2:
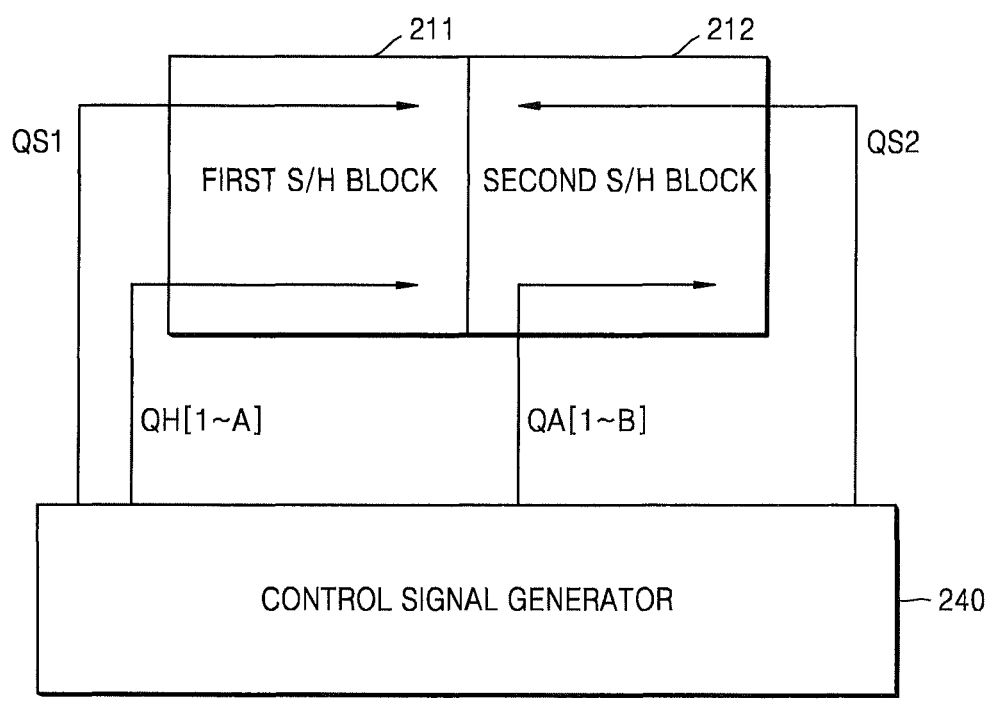
FIG. 2 is a block diagram showing an example of a control operation in a touchscreen controller of FIG. 1.

FIG. 2 is a block diagram showing an example of a control operation in the touchscreen controller 200 of FIG. 1. Referring to FIGS. 1 and 2, the touchscreen controller 200 may include the first S/H block 211, the second S/H block 212, and a control signal generator 240. Although not shown in FIG. 2 for convenience of explanation, the touchscreen controller 200 may further include the ADC 220 and the DSP 230 of FIG. 1.

Each of the first and second S/H blocks 211 and 212 may sample touch inputs and output stored touch inputs. According to some embodiments, the control signal generator 240 may output a first sampling signal QS1 to the first S/H block 211, and output a second sampling signal QS2 to the second S/H block 212. In addition, the control signal generator 240 may generate first and second output control signals QH[1~A] and QA[1~B] in relation to output of touch inputs and provide the same to the first and second S/H blocks 211 and 212, respectively.

According to some embodiments, a plurality of first S/H circuits included in the first S/H block 211 may simultaneously perform sampling in response to the first sampling signal QS1. A plurality of second S/H circuits included in the second S/H block 212 may simultaneously perform sampling in response to the second sampling signal QS2. In addition, the first S/H block 211 may sequentially provide the capacitive touch inputs V1_1 to V1_A to the ADC 220 in response to the first output control signals QH[1~A]. The second S/H block 212 may sequentially provide the force touch inputs V2_1 to V2_B to the ADC 220 in response to the second output control signals QA[1~B]. An example of a touchscreen operation according to embodiments of the inventive concept will now be described in detail.

Figure 3:
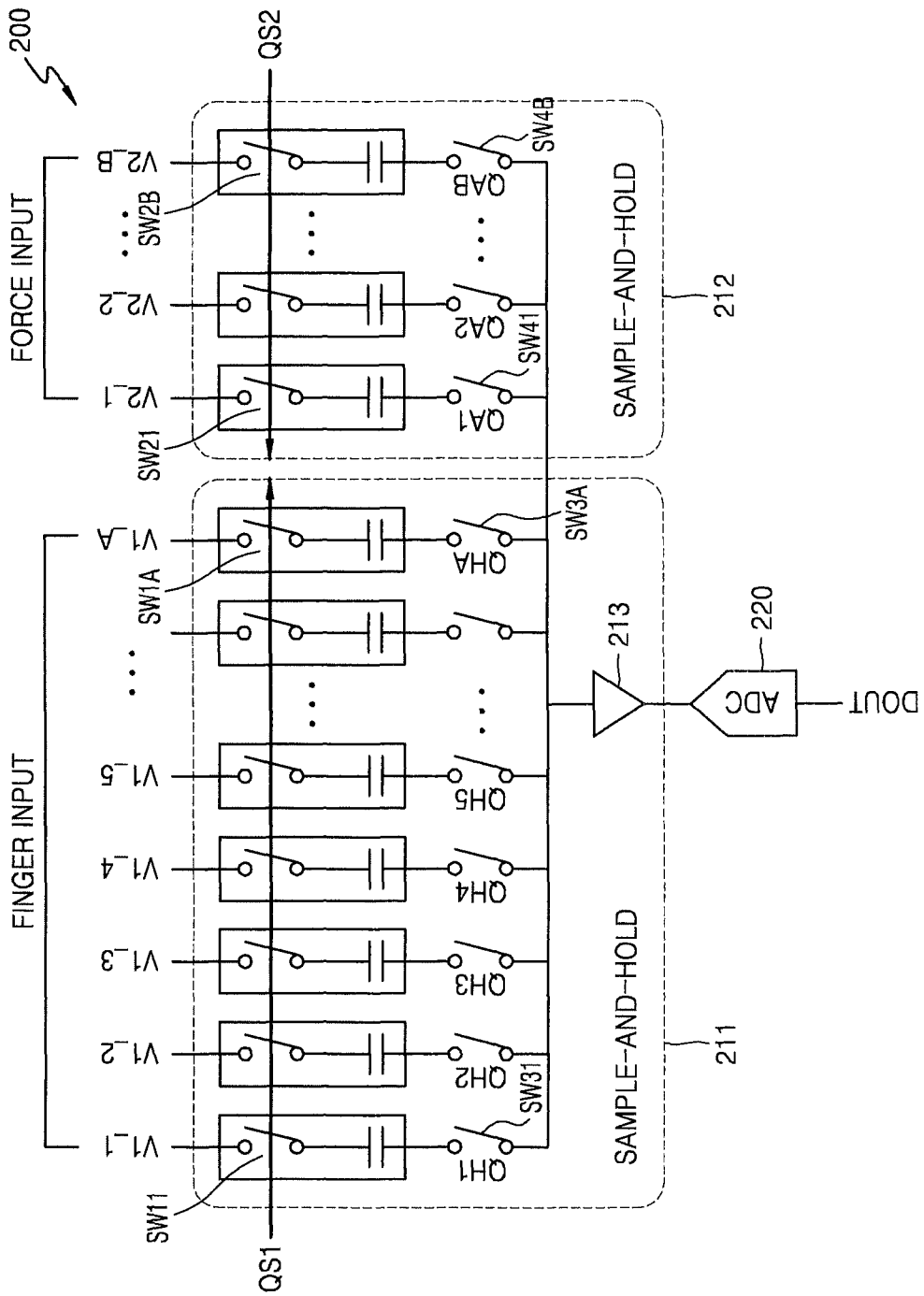
FIG. 3 is a circuit diagram showing an example of first and second sample-and-hold (S/H) blocks of FIG. 2.
Figure 4:
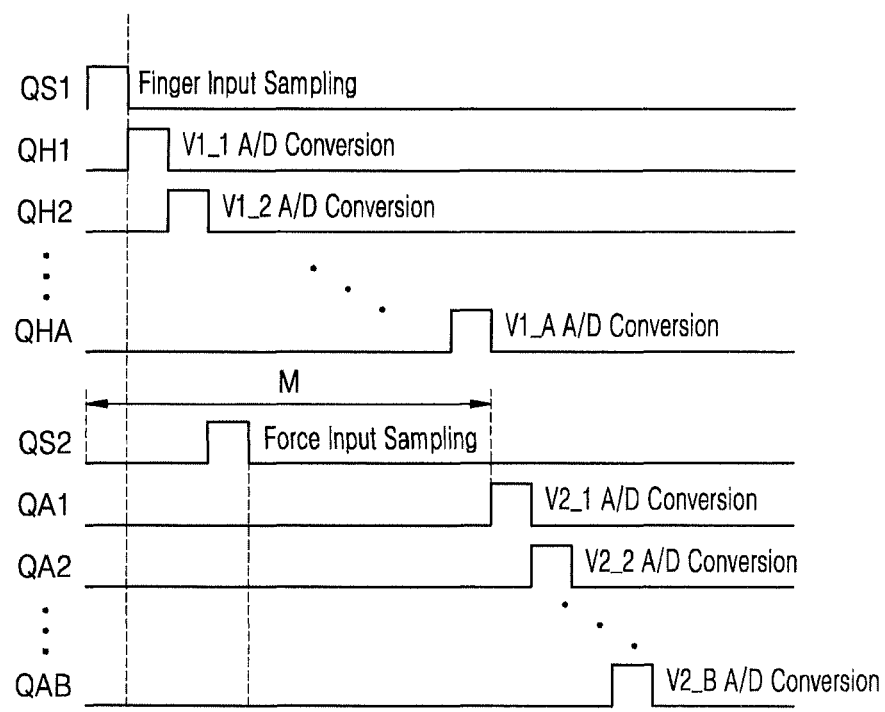
FIG. 4 is a waveform diagram showing an example of operations of the first and second S/H blocks.

FIG. 3 is a circuit diagram showing an example of the first and second S/H blocks 211 and 212 of FIG. 2, and FIG. 4 is a waveform diagram showing an example of operations of the first and second S/H blocks 211 and 212. Referring to FIG. 3, the first S/H block 211 may include a plurality of first S/H circuits, and each first S/H circuit may include a sampling switch, an output control switch, and a storage element. The second S/H block 212 may include a plurality of second S/H circuits, and each second S/H circuit may include a sampling switch, an output control switch, and a storage element. FIG. 3 shows an example in which each S/H circuit includes a capacitor as the storage element. One or more amplifiers may be provided to correspond to the first and second S/H circuits, and FIG. 3 shows an example in which a single amplifier 213 is included in the first S/H block 211. However, embodiments of the inventive concept are not limited thereto, and the amplifier 213 may be included in the second S/H block 212. The above-described structure including S/H circuits and an amplifier may be referred to as a sample-and-hold amplifier (SHA). In some embodiments, the amplifier 213 may be provided outside the first and second S/H blocks 211 and 212.

The first S/H block 211 may include A first S/H circuits, and thus may include A first sampling switches SW11 to SW1A, A storage elements, and A first output control switches SW31 to SW3A. As the first sampling switches SW11 to SW1A are turned on, the first S/H block 211 may sample the capacitive touch inputs V1_1 to V1_A generated based on sensed signals received through A first channels. The second S/H block 212 may include B second S/H circuits, and thus may include B second sampling switches SW21 to SW2B, B storage elements, and B second output control switches SW41 to SW4B. As the second sampling switches SW21 to SW2B are turned on, the second S/H block 212 may sample the force touch inputs V2_1 to V2_B generated based on sensed signals received through B second channels.

Referring to FIG. 4, the A first sampling switches SW11 to SW1A of the first S/H block 211 may be simultaneously turned on in response to activation of the first sampling signal QS1, and thus the capacitive touch inputs V1_1 to V1_A may be simultaneously sampled. The sampled capacitive touch inputs V1_1 to V1_A may be stored in the storage elements of the first S/H block 211.

After the capacitive touch inputs V1_1 to V1_A are sampled, the first output control signals QH[1~A] may be sequentially asserted, and thus the capacitive touch inputs V1_1 to V1_A may be sequentially provided to the ADC 220 through the amplifier 213. The ADC 220 may sequentially convert the capacitive touch inputs V1_1 to V1_A into digital signals, and output the converted digital signals as touch data DOUT.

The second sampling signal QS2 may be generated asynchronously from the first sampling signal QS1, and thus may be asserted at an arbitrary timing. For example, the second sampling signal QS2 may be asserted at an arbitrary timing within a period after the first sampling signal QS1 is asserted and before the second output control signals QA[1~B] are asserted (e.g., a period M). As the second sampling signal QS2 is asserted, the B second sampling switches SW21 to SW2B may be simultaneously turned on, and thus the force touch inputs V2_1 to V2_B may be simultaneously sampled. The sampled force touch inputs V2_1 to V2_B may be stored in the storage elements of the second S/H block 212. Although the embodiments of FIG. 4 shows that the second sampling signal QS2 is asserted while the capacitive touch inputs V1_1 to V1_A are being converted into digital signals, embodiments of the inventive concept are not limited thereto and the second sampling signal QS2 may be asserted at various timings.

After all of the first output control signals QH[1~A] are asserted, the second output control signals QA[1~B] may be sequentially asserted. While all of the first output control signals QH[1~A] are being asserted, the force touch inputs V2_1 to V2_B sampled based on the second sampling signal QS2 may be retained in the second S/H block 212. As the second output control signals QA[1~B] are sequentially asserted, the force touch inputs V2_1 to V2_B may be sequentially provided to the ADC 220 through the amplifier 213, and the ADC 220 may convert the force touch inputs V2_1 to V2_B into digital signals.

According to the afore-described embodiments, since the first and second S/H blocks 211 and 212 are controlled based on different sampling signals, even when the second sampling signal QS2 is asserted, the sampled capacitive touch inputs V1_1 to V1_A may be retained in the first S/H block 211 without being lost. Even when the second sampling signal QS2 is asserted while the capacitive touch inputs V1_1 to V1_A are being converted into digital signals, all of the sampled capacitive touch inputs V1_1 to V1_A may be normally converted into digital signals by the ADC 220. In addition, since the single ADC 220 may be provided to correspond to a plurality of S/H circuits for sampling multiple types of touch inputs, the size of a semiconductor chip may be reduced due to a reduction in number of ADCs 220.

In the embodiments of FIG. 4, the second sampling signal QS2 may be asserted at the same timing as that of the first sampling signal QS1. In some embodiments, the second sampling signal QS2 may be asserted at an arbitrary timing. For example, the second sampling signal QS2 may be asserted at an arbitrary timing before the second output control signals QA[1~B] are asserted.

Although the afore-described embodiments shows that the first sampling signal QS1 is initially asserted and then the second sampling signal QS2 is asserted while the first output control signals QH[1~A] are being sequentially asserted, embodiments of the inventive concepts are not limited thereto. For example, in a single sampling cycle for sampling the capacitive touch inputs V1_1 to V1_A and the force touch inputs V2_1 to V2_B one time, the force touch inputs V2_1 to V2_B may be initially converted into digital signals. In this case, the second sampling signal QS2 may be initially asserted and then the first sampling signal QS1 may be asserted while the second output control signals QA[1~B] are being sequentially asserted. The first output control signals QH[1~A] may be sequentially asserted after all of the second output control signals QA[1~B] are asserted.

In the afore-described embodiments, the number of inputs of each of the first and second S/H blocks 211 and 212 may be variously set. For example, when a single ADC is provided for all channels, a total number of channels related to capacitive touches may equal the number of inputs of the first S/H block 211, and a total number of channels related to force touches may equal the number of inputs of the second S/H block 212. In some embodiments, all channels may be divided into two groups and a single ADC may be provided for each group. In this case, the number of inputs of the first S/H block 211 may correspond to a part of the channels related to capacitive touches, and the number of inputs of the second S/H block 212 may correspond to a part of the channels related to force touches.

Figure 5:
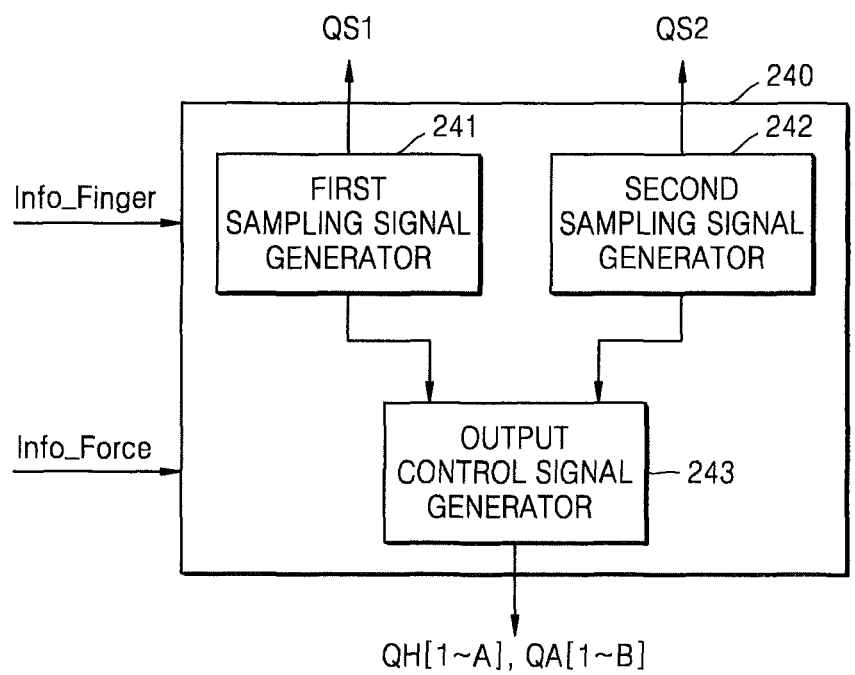
FIG. 5 is a block diagram showing an example of a control signal generator of FIG. 4.

FIG. 5 is a block diagram showing an example of the control signal generator 240 of FIG. 4.

Referring to FIGS. 1 to 5, the control signal generator 240 may generate the first sampling signal QS1, the second sampling signal QS2, and the first and second output control signals QH[1~A] and QA[1~B] based on various types of information related to a touchscreen operation. The control signal generator 240 may receive first information Info_Finger related to sensing of capacitive touches and second information Info_Force related to sensing of force touches. The control signal generator 240 may include a first sampling signal generator 241, a second sampling signal generator 242, and an output control signal generator 243.

For example, the touchscreen controller 200 may generate the capacitive touch inputs V1_1 to V1_A and the force touch inputs V2_1 to V2_B by performing an AFE operation on sensed signals received from the touchscreen panel 100. In this case, the first information Info_Finger and the second information Info_Force may correspond to timing information related to the AFE operation. For instance, the first sampling signal generator 241 may assert the first sampling signal QS1 by sufficiently increasing voltage levels of the capacitive touch inputs V1_1 to V1_A based on the first information Info_Finger. For example, the capacitive touch inputs V1_1 to V1_A may be generated by performing various AFE operations such as a voltage read operation, amplification operation, and integration operation, and the first information Info_Finger may include information about at least one of timings for controlling the various operations.

Similarly, the second sampling signal generator 242 may assert the second sampling signal QS2 by sufficiently increasing voltage levels of the force touch inputs V2_1 to V2_B based on the second information Info_Force. The second information Info_Force may include information about at least one of various timings related to generation of the force touch inputs V2_1 to V2_B.

The output control signal generator 243 may generate the first and second output control signals QH[1~A] and QA[1~B] in response to activation of the first and second sampling signals QS1 and QS2. For example, information indicating activation of the first and second sampling signals QS1 and QS2 may be provided to the output control signal generator 243, and the output control signal generator 243 may assert the first output control signals QH[1~A] after the first sampling signal QS1 is asserted. In some embodiments, the first output control signals QH[1~A] may be asserted after a predetermined time from when the first sampling signal QS1 is asserted. The first output control signals QH[1~A] may include A first output control signals for controlling the A different first output control switches SW31 to SW3A, and the A first control signals may be sequentially asserted in a time division manner.

Similarly, the output control signal generator 243 may assert the second output control signals QA[1~B] after the second sampling signal QS2 is asserted. The second output control signals QA[1~B] may include B second output control signals for controlling the B different second output control switches SW41 to SW4B, and the B second control signals may be sequentially asserted in a time division manner.

Although FIG. 5 shows that the control signal generator 240 receives the first information Info_Finger and the second information Info_Force from and external source, embodiments of the inventive concepts are not limited thereto. According to some embodiments, various control signals for the above-described AFE operation may be generated by the control signal generator 240. In this case, the first information Info_Finger and the second information Info_Force may be generated by the control signal generator 240 and may be provided to the first and second sampling signal generators 241 and 242.

Figure 6:
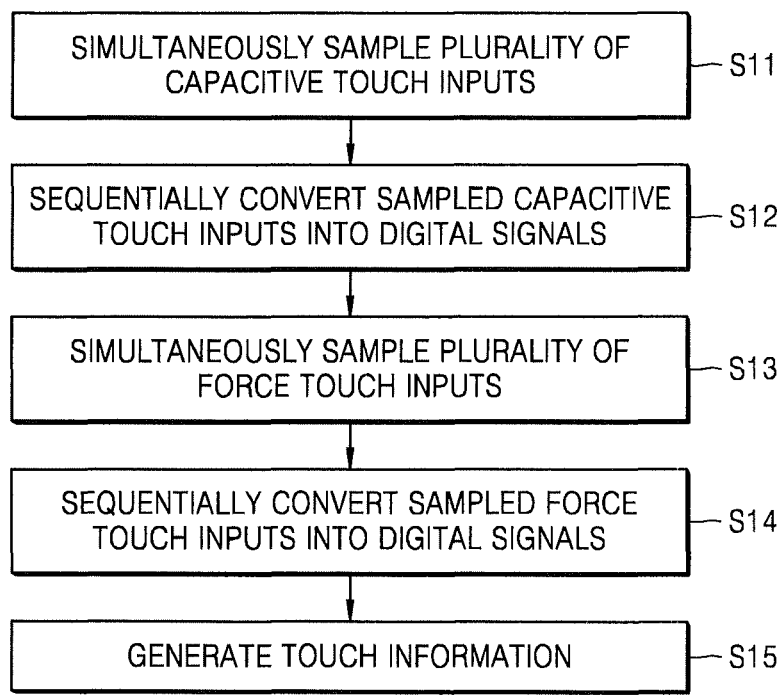
FIGS. 6 and 7 are flowcharts of an operating method of a touchscreen controller, according to embodiments of the inventive concept.
Figure 7:
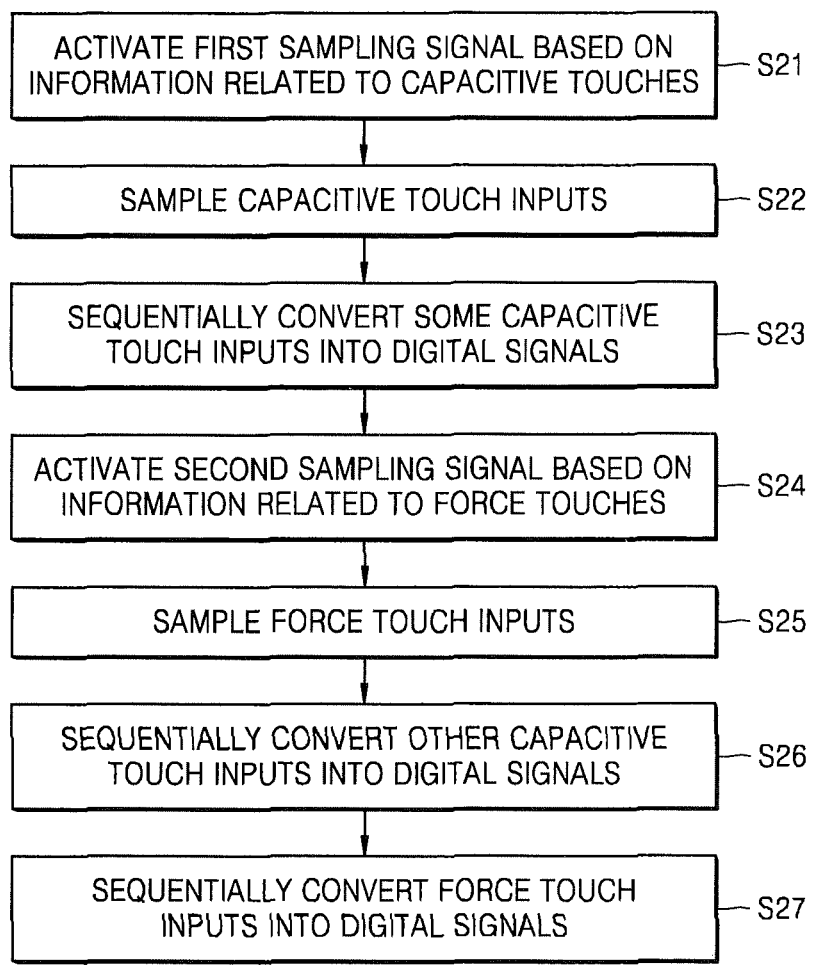

FIGS. 6 and 7 are flowcharts of an operating method of a touchscreen controller, according to embodiments of the inventive concept. Referring to FIG. 6, an operation related to capacitive touches and an operation related to force touches may be independently performed, and thus capacitive touch inputs for sensing capacitive touches and force touch inputs for sensing force touches may be asynchronously sampled. For example, a plurality of capacitive touch inputs may be simultaneously sampled by the touchscreen controller (S11), and the sampled capacitive touch inputs may be sequentially converted into digital signals by a single ADC (e.g., a common ADC) (S12).

A plurality of force touch inputs may be simultaneously sampled (S13), and the sampled force touch inputs may be sequentially converted into digital signals by the common ADC (S14). Touch information including information indicating whether a touch is made, a location of the touch, a force of the touch, etc. may be generated by processing the capacitive touch inputs and the force touch inputs converted into the digital signals (S15).

Referring to FIG. 7, the touchscreen controller may assert a first sampling signal QS1 based on information related to capacitive touches (S21). A plurality of capacitive touch inputs may be sampled based on the asserted first sampling signal QS1 (S22). The sampled capacitive touch inputs may be sequentially converted into digital signals. For example, some capacitive touch inputs may be sequentially converted into digital signals (S23), and a second sampling signal QS2 may be asserted based on information related to force touches while the capacitive touch inputs are being converted into digital signals (S24). A plurality of force touch inputs may be sampled based on the asserted second sampling signal QS2 (S25). Since only the force touch inputs are selectively sampled, the other capacitive touch inputs which are sampled but not yet converted into digital signals may be retained as the sampled data.

After the second sampling signal QS2 is asserted, the other capacitive touch inputs may be sequentially converted into digital signals (S26). After all of the capacitive touch inputs are converted into digital signals, the force touch inputs may be sequentially converted into digital signals (S27).

Figure 8:
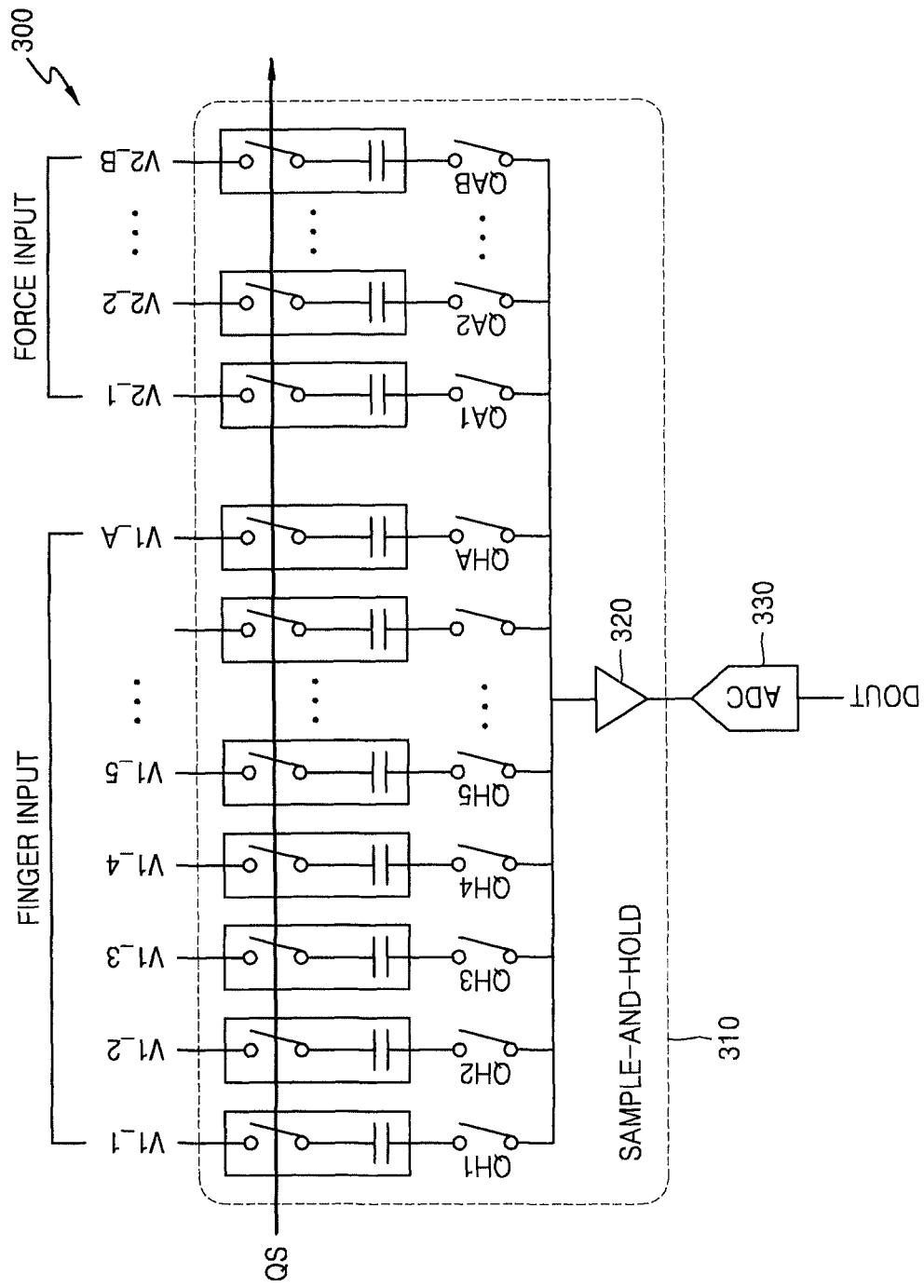
FIG. 8 is a circuit diagram showing an example of an S/H block according to some embodiments of the inventive concept.
Figure 9:
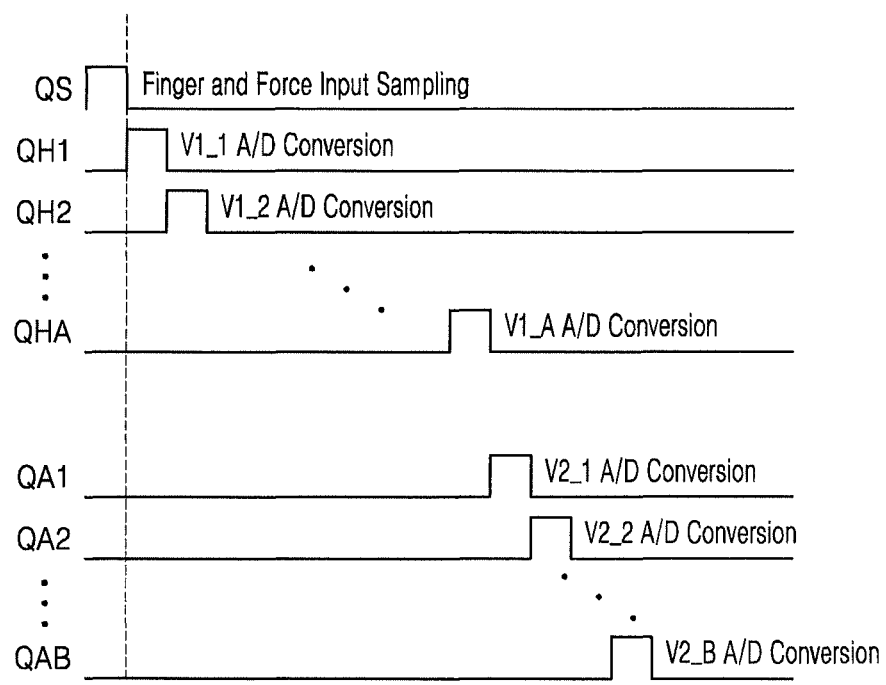
FIGS. 9 and 10 are waveform diagrams showing examples of operation of the S/H block.
Figure 10:
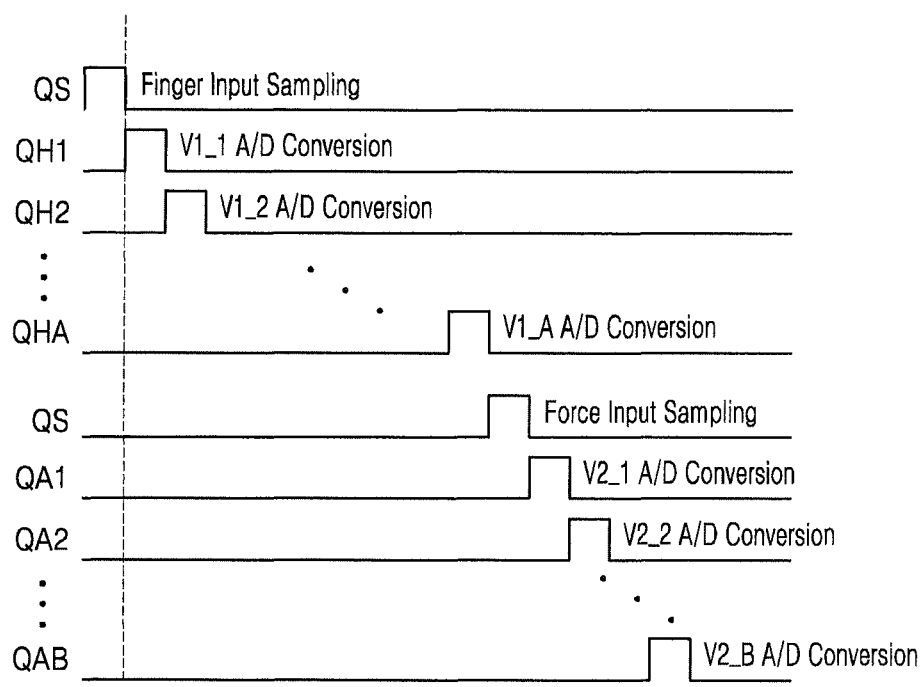

FIG. 8 is a circuit diagram showing an example of an S/H block 310 according to some embodiments of the inventive concept, and FIGS. 9 and 10 are waveform diagrams showing examples of operation of the S/H block 310.

Referring to FIGS. 8 and 9, a touchscreen controller 300 may include the S/H block 310, an amplifier 320, and an ADC 330. Among the circuits illustrated in FIG. 8, the circuits described above in relation to the previous embodiments will not be described in detail herein.

The S/H block 310 may include a plurality of S/H circuits corresponding to a plurality of channels. According to some embodiments, the S/H circuits of the S/H block 310 are not limited to a certain touch scheme but may receive touch inputs based on various touch schemes. For example, the S/H circuits of the S/H block 310 may receive capacitive touch inputs or force touch inputs as described above. According to some embodiments of the inventive concept, some S/H circuits of the S/H block 310 may receive capacitive touch inputs, and the other S/H circuits may receive force touch inputs.

An example of an operation of receiving both of capacitive touch inputs and force touch inputs by the S/H block 310 will now be described. It is assumed that the S/H block 310 includes A+B S/H circuits and that the A S/H circuits (e.g., first S/H circuits) receive capacitive touch inputs whereas the other B S/H circuits (e.g., second S/H circuits) receive force touch inputs.

The S/H circuits of the S/H block 310 may be controlled based on a common sampling signal QS. For example, as the sampling signal QS is commonly provided to the A+B S/H circuits of the S/H block 310, capacitive touch inputs V1_1 to V1_A and force touch inputs V2_1 to V2_B may be simultaneously sampled. As first output control signals QH[1~A] are sequentially asserted after the sampling signal QS is asserted, the capacitive touch inputs V1_1 to V1_A may be sequentially provided to the ADC 330 through the amplifier 320. Thereafter, as second output control signals QA[1~B] are sequentially asserted, the force touch inputs V2_1 to V2_B may be sequentially provided to the ADC 330 through the amplifier 320. That is, according to the embodiments of FIG. 9, the sampling signal QS may not be separately asserted for the capacitive touch inputs V1_1 to V1_A and the force touch inputs V2_1 to V2_B but may be asserted one time to simultaneously sample the capacitive touch inputs V1_1 to V1_A and the force touch inputs V2_1 to V2_B.

According to the structure illustrated in FIG. 8, exclusive S/H circuits for the capacitive touch inputs V1_1 to V1_A and the force touch inputs V2_1 to V2_B may not be separately provided but the ADC 330 may be shared by the A+B S/H circuits. That is, even when a process based on capacitive touches and a process based on force touches are independently performed, the sampling signal QS for sampling the capacitive touch inputs V1_1 to V1_A and the force touch inputs V2_1 to V2_B is asserted only one time in a single sampling cycle, and thus both of the capacitive touch inputs V1_1 to V1_A and the force touch inputs V2_1 to V2_B may be normally converted into digital signals.

FIG. 10 shows another example of operation of the touchscreen controller 300 illustrated in FIG. 8.

Referring to FIGS. 8 and 10, the S/H block 310 may be controlled based on the common sampling signal QS, and the sampling signal QS may be asserted at least two times to sample the capacitive touch inputs V1_1 to V1_A and the force touch inputs V2_1 to V2_B. For example, a process based on capacitive touches and a process based on force touches may be independently performed, and thus a first timing for asserting the sampling signal QS may be controlled based on the capacitive touch process whereas a second timing for asserting the sampling signal QS may be controlled based on the force touch process.

For example, the sampling signal QS may be asserted at a timing before the first output control signals QH[1~A] are asserted, and thus the capacitive touch inputs V1_1 to V1_A may be stored in the first S/H circuits of the S/H block 310. Thereafter, as the first output control signals QH[1~A] are sequentially asserted, the capacitive touch inputs V1_1 to V1_A may be sequentially provided to the ADC 330 through the amplifier 320.

After all of the first output control signals QH[1~A] are asserted, the sampling signal QS may be asserted again to sample the force touch inputs V2_1 to V2_B. As such, the force touch inputs V2_1 to V2_B may be stored in the second S/H circuits of the S/H block 310. Thereafter, as the second output control signals QA[1~B] are sequentially asserted, the force touch inputs V2_1 to V2_B may be sequentially provided to the ADC 330 through the amplifier 320.

In the embodiments of FIG. 10, the sampling signal QS for sampling the force touch inputs V2_1 to V2_B may be asserted at a timing after all of the first output control signals QH[1~A] are asserted and before the second output control signals QA[1~B] are asserted. As such, even when the sampling signal QS is asserted to sample the force touch inputs V2_1 to V2_B, since all of the sampled and stored capacitive touch inputs V1_1 to V1_A are converted into digital signals, information related to capacitive touches may be normally processed.

For the above-described operation, the sampling signal QS may be asserted using information related to generation of an output control signal in addition to information related to processing of capacitive and force touches. For example, the sampling signal QS may be asserted to sample the capacitive touch inputs V1_1 to V1_A, and then may be asserted again to sample the force touch inputs V2_1 to V2_B based on information indicating that all of the first output control signals QH[1~A] are asserted. The second output control signals QA[1~B] may be asserted based on information indicating that the sampling signal QS is asserted again, and thus activation of the second output control signals QA[1~B] before the sampling signal QS for sampling the force touch inputs V2_1 to V2_B is asserted may be prevented.

According to the embodiments of FIGS. 8 to 10, since the S/H block 310 may process touch inputs based on various touch schemes, the number of S/H circuits included in the touchscreen controller 300 may be reduced. The touchscreen controller 300 may operate in various modes. For example, when force sensing is inasserted, all S/H circuits in the S/H block 310 may be used to sample capacitive touch inputs.

Figure 11:
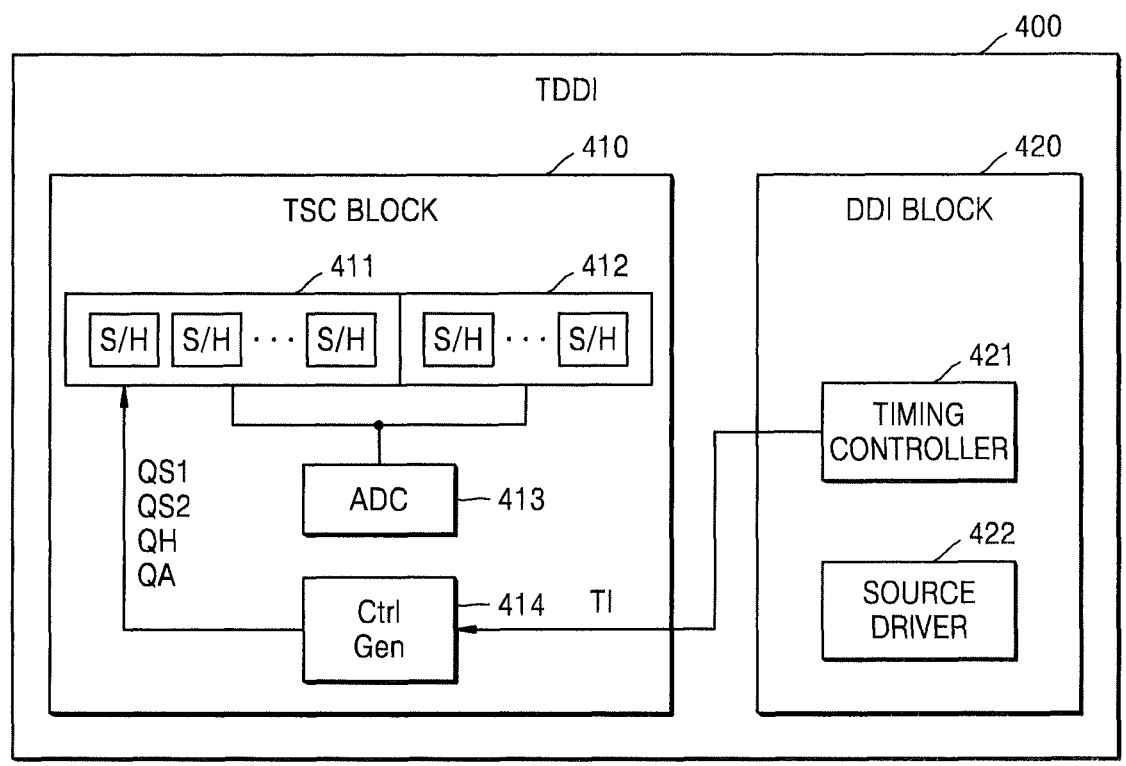
FIG. 11 is a block diagram showing an example in which a touchscreen controller according to embodiments of the inventive concept is implemented as a touch-display driver IC (TDDI)

FIG. 11 is a block diagram showing an example in which a touchscreen controller according to embodiments of the inventive concept is implemented as a touch-display driver IC (TDDI) 400. Referring to FIG. 11, the TDDI 400 may include a touchscreen controller (TSC) block 410 and a display driver IC (DDI) block 420. The TDDI 400 may be implemented as a single semiconductor chip, and thus the TSC block 410 and the DDI block 420 may be integrated on the same semiconductor chip.

The TSC block 410 may include various elements for processing touch inputs based on various touch schemes according to the afore-described embodiments. For example, the TSC block 410 may include a first S/H block 411, a second S/H block 412, an ADC 413, and a control signal generator 414. The TSC block 410 may receive sensed signals based on two or more touch schemes, and perform an AFE operation on the received sensed signals to provide two or more types of touch inputs to the first and second S/H blocks 411 and 412. A single ADC 413 may be provided to correspond to a plurality of S/H circuits included in the first and second S/H blocks 411 and 412. The ADC 413 may sequentially receive a plurality of capacitive touch inputs and a plurality of force touch inputs and convert the same into digital signals according to the afore-described embodiments.

The control signal generator 414 may generate various control signals for controlling the first and second S/H blocks 411 and 412 according to the afore-described embodiments, based on at least one type of information. For example, the control signal generator 414 may generate a first sampling signal QS1 for sampling the capacitive touch inputs, a second sampling signal QS2 for sampling the force touch inputs, a first output control signal QH for controlling a timing for outputting the sampled capacitive touch inputs to the ADC 413, and a second output control signal QA for controlling a timing for outputting the sampled force touch inputs to the ADC 413.

The DDI block 420 may include a timing controller 421 and a source driver 422 as elements for displaying an image on a display panel (not shown). Although not shown in FIG. 11, the DDI block 420 may further include various other elements for displaying the image, e.g., a gate driver and a power generator.

The timing controller 421 may generate various types of timing information TI in relation to the display operation. For example, the timing controller 421 may generate a vertical synchronization signal or a horizontal synchronization signal in relation to the display operation, or generate various types of timing information for controlling generation of a common electrode voltage or a gate line signal.

To generate touch information, the TSC block 410 may use at least one type of the timing information TI received from the timing controller 421. For instance, the TSC block 410 may perform the above-described sampling operation based on the timing information TI received from the timing controller 421. For example, the sensed signals may have noise due to driving of various types of electrodes provided on a display panel (e.g., common voltage electrodes), and the TSC block 410 may perform the sensing operation or the sampling operation according to the afore-described embodiments at a timing when the noise is minimized based on the timing information TI.

The control signal generator 414 may generate the first and second sampling signals QS1 and QS2 based on various types of information according to the afore-described embodiments. For example, the control signal generator 414 may generate the first and second sampling signals QS1 and QS2 based on timings related to an AFE operation in the TSC block 410. Otherwise, the control signal generator 414 may generate the first and second sampling signals QS1 and QS2 based on the timing information TI received from the timing controller 421. In some embodiments, the control signal generator 414 may generate the first and second sampling signals QS1 and QS2 based on the timings related to the AFE operation together with the timing information TI received from the timing controller 421.

Although not shown in FIG. 11, various signals other than the timing information TI may be transmitted and received between the TSC block 410 and the DDI block 420. For example, the DDI block 420 may provide signals for controlling various modes related to a touchscreen operation, to the TSC block 410, provide various types of information indicating a state of the TDDI 400 (e.g., a sleep state and a power-down state), to the TSC block 410, or generate various voltages used in the TSC block 410 and provide the same to the TSC block 410.

Figure 12:
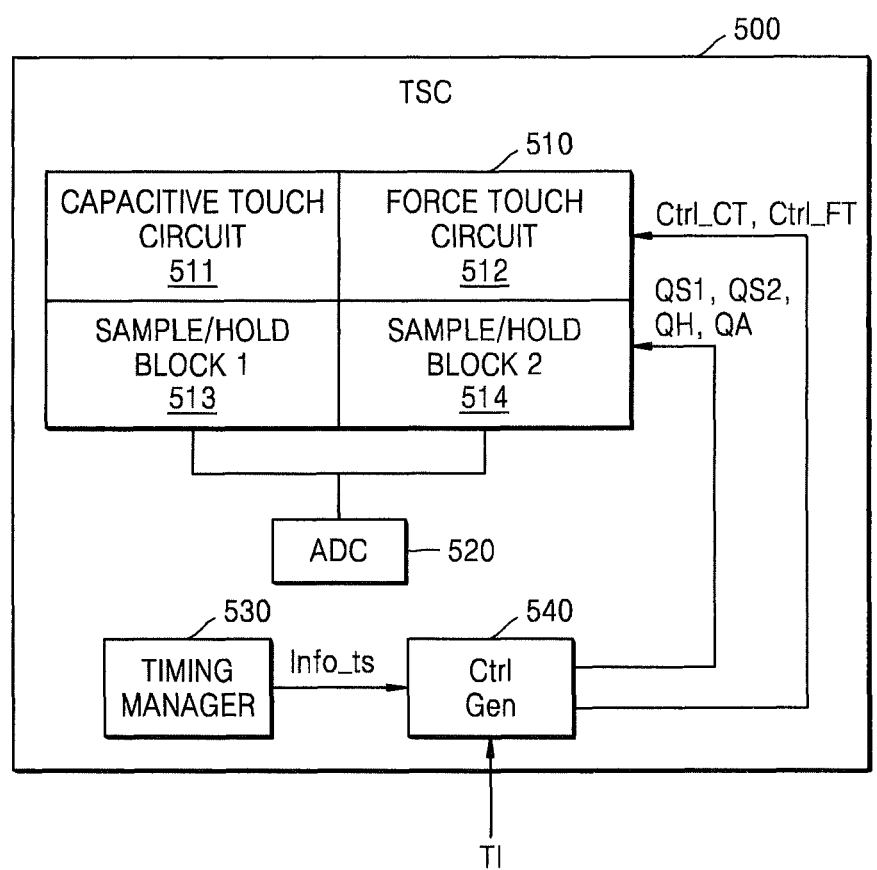
FIG. 12 is a block diagram showing an example in which a touchscreen controller according to embodiments of the inventive concept is implemented as a chip separate from a display driver IC (DDI)

FIG. 12 is a block diagram showing an example in which a touchscreen controller 500 according to embodiments of the inventive concept is implemented as a chip separate from a DDI. Referring to FIG. 12, the touchscreen controller 500 may include an AFE 510, an ADC 520, a timing manager 530, and a control signal generator 540. The AFE 510 may include various circuits for processing sensed signals received through a plurality of channels. For example, in FIG. 12, the AFE 510 may include a capacitive touch circuit 511 for generating capacitive touch inputs and a force touch circuit 512 for generating force touch inputs. The AFE 510 may further include a first S/H block 513 and a second S/H block 514. The ADC 520 is shared by the first and second S/H blocks 513 and 514. Although FIG. 12 shows that the ADC 520 is provided outside the AFE 510, the ADC 520 may be provided inside the AFE 510.

The timing manager 530 may control various timing operations related to a touchscreen operation. For example, the timing manager 530 may provide timing information Info_ts to the control signal generator 540. The control signal generator 540 may generate one or more control signals Ctrl_CT for controlling the capacitive touch circuit 511 in the AFE 510 and generate one or more control signals Ctrl_FT for controlling the force touch circuit 512, based on the timing information Info_ts. In addition, the control signal generator 540 may generate a first sampling signal QS1, a second sampling signal QS2, a first output control signal QH, and a second output control signal QA based on the timing information Info_ts.

According to some embodiments, an activation timing of the first sampling signal QS1 may be controlled based on the control signals Ctrl_CT. For instance, the activation timing of the first sampling signal QS1 may be controlled in relation to an operation in the capacitive touch circuit 511. For example, to perform sampling at a timing when voltage levels of capacitive touch inputs are sufficiently increased, the activation timing of the first sampling signal QS1 may be controlled in relation to an integration operation in the capacitive touch circuit 511. Similarly, an activation timing of the second sampling signal QS2 may be controlled based on the control signals Ctrl_FT. The first output control signal QH may be generated in synchronization with the first sampling signal QS1, and the second output control signal QA may be generated in synchronization with the second sampling signal QS2. As such, the control signal generator 540 may generate control signals having waveforms based on various schemes according to the afore-described embodiments.

The touchscreen controller 500 may receive at least one type of timing information TI related to a display driving operation, from the external DDI, and the control signal generator 540 may generate the control signals having waveforms based on various schemes by further using the timing information TI.

Figure 13:
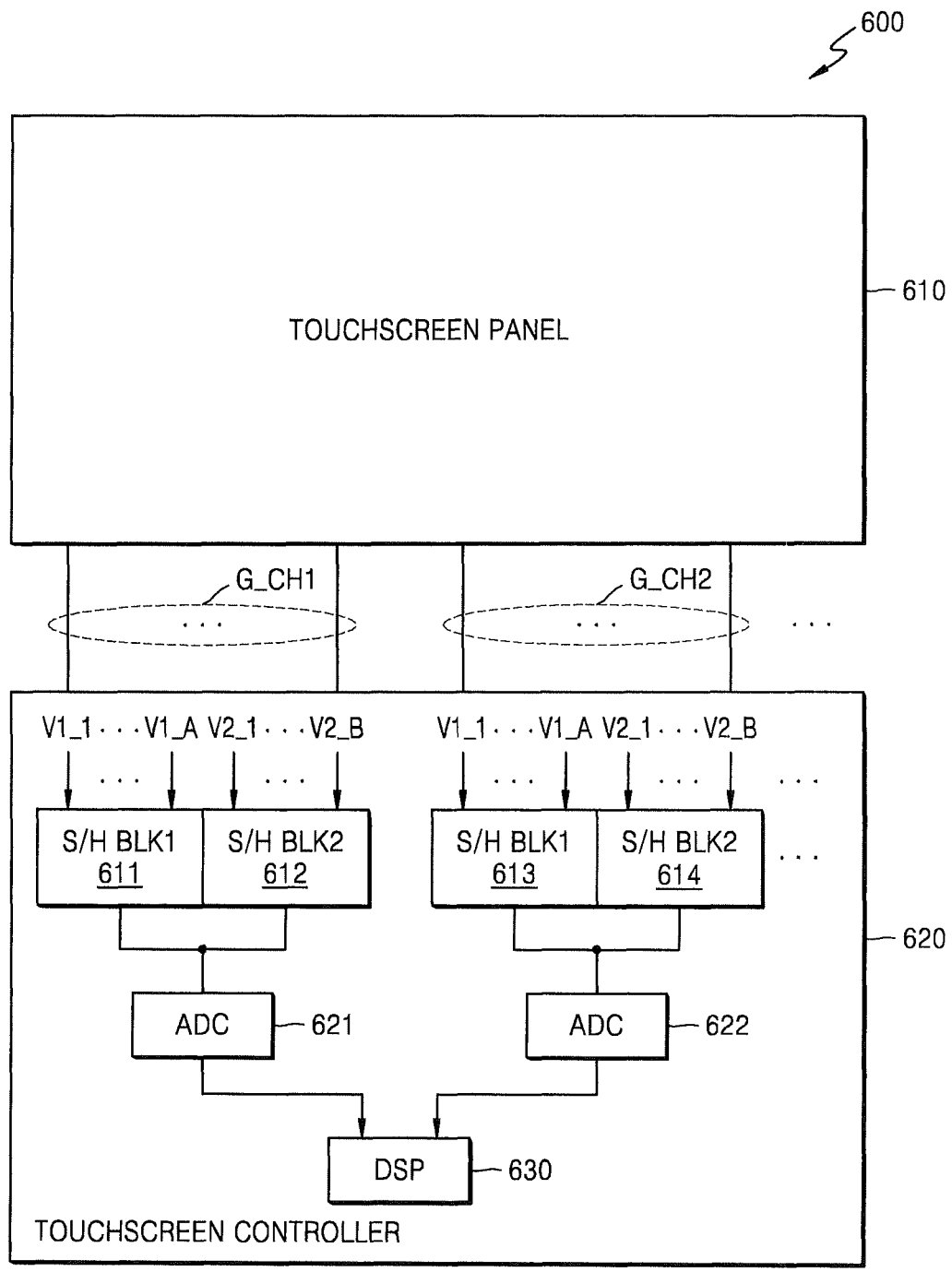
FIG. 13 is a block diagram of a touchscreen system according to further embodiments of the inventive concept.

FIG. 13 is a block diagram of a touchscreen system 600 according to further embodiments of the inventive concept. Referring to FIG. 13, the touchscreen system 600 may include a touchscreen panel 610 and a touchscreen controller 620, and the touchscreen controller 620 may be connected to the touchscreen panel 610 through a plurality of channels. For example, the channels may be divided into two or more groups. For convenience of explanation, a first channel group G_CH1 and a second channel group G_CH2 are used to describe the embodiments of the inventive concept.

Each channel group may include a plurality of channels connected to capacitive sensing electrodes and a plurality of channels connected to force sensing electrodes. As such, each channel group may deliver a plurality of sensed signals related to capacitive touches and a plurality of sensed signals related to force touches.

The touchscreen controller 620 may include a plurality of S/H block groups (e.g., first and second S/H block groups). Each S/H block group may include first and second S/H blocks according to the afore-described embodiments. For instance, the first S/H block group may include first and second S/H blocks 611 and 612, and the second S/H block group may include first and second S/H blocks 613 and 614. Like or similarly to the afore-described embodiments, each S/H block group may sample capacitive touch inputs and force touch inputs. For example, in the first S/H block group, the first S/H block 611 may sample capacitive touch inputs V1_1 to V1_A, and the second S/H block 612 may sample force touch inputs V2_1 to V2_B.

The touchscreen controller 620 may further include a plurality of ADCs (e.g., first and second ADCs 621 and 622), and each ADC may correspond to each S/H block group. For example, the first ADC 621 may correspond to the first S/H block group, and the second ADC 622 may correspond to the second S/H block group. The touchscreen controller 620 may further include a DSP 630 for receiving digital-converted touch inputs from the first and second ADCs 621 and 622.

Each S/H block group may be controlled based on a first sampling signal, a second sampling signal, and first and second output control signals according to the afore-described embodiments. The first and second sampling signals and the first and second output control signals may have waveforms according to the afore-described embodiments, and each S/H block group may sample touch inputs based on different touch schemes and output the same according to the afore-described embodiments. According to the embodiments of FIG. 13, by varying placement of S/H block groups and ADCs based on the number of channels, the speed of a process for generating touch information may be increased.

Figure 14:
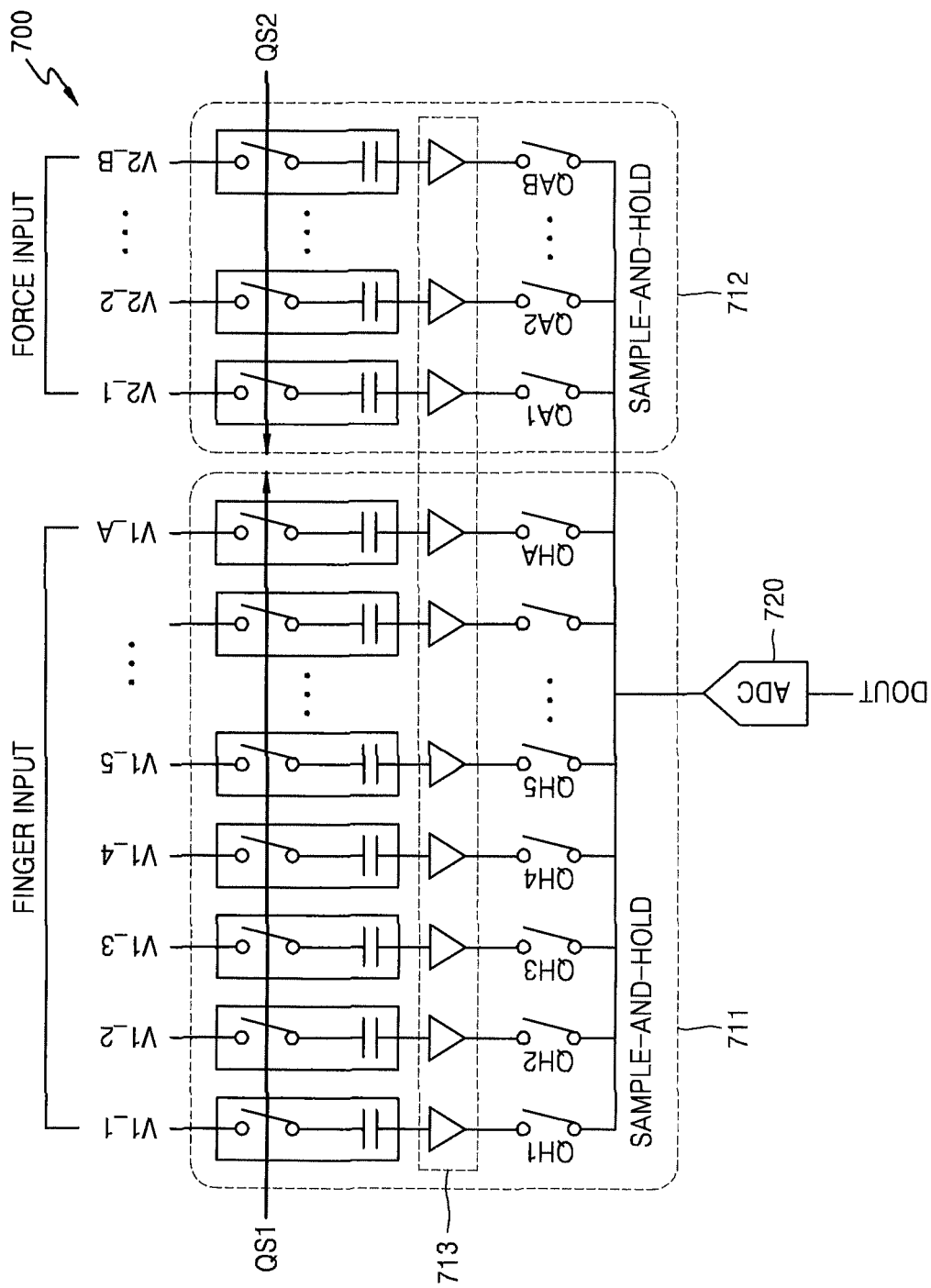
FIG. 14 is a circuit diagram showing an example of a touchscreen controller according to some embodiments of the inventive concept.

FIG. 14 is a circuit diagram showing an example of a touchscreen controller 700 according to some embodiments of the inventive concept. Referring to FIG. 14, the touchscreen controller 700 may include a first S/H block 711 for sampling capacitive touch inputs V1_1 to V1_A, a second S/H block 712 for sampling force touch inputs V2_1 to V2_B, and an ADC 720 shared by the first and second S/H blocks 711 and 712. The first S/H block 711 may include a plurality of first S/H circuits, and the second S/H block 712 may include a plurality of second S/H circuits.

As in the afore-described embodiments, the first S/H block 711 may perform a sampling operation based on a first sampling signal QS1, and the second S/H block 712 may perform a sampling operation based on a second sampling signal QS2 generated independently of the first sampling signal QS1. In the current embodiments, the touchscreen controller 700 may further include an amplifier block 713 including a plurality of amplifiers corresponding to the first S/H circuits and the second S/H circuits.

According to the embodiments of FIG. 14, the capacitive touch inputs V1_1 to V1_A may be simultaneously amplified and the force touch inputs V2_1 to V2_B may be simultaneously amplified by the amplifiers, and the amplified capacitive touch inputs V1_1 to V1_A and the amplified force touch inputs V2_1 to V2_B may be sequentially provided to the ADC 720 through switches. As such, the amplified touch inputs may be stably provided to the ADC 720 by the amplifiers.

Figure 15:
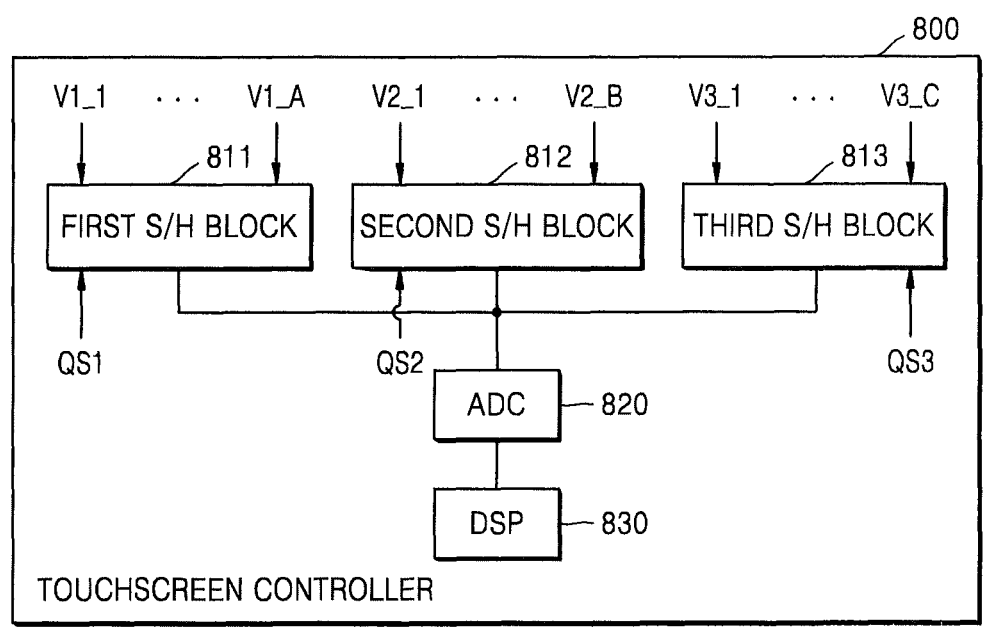
FIG. 15 is a block diagram showing an example of a touchscreen controller according to some embodiments of the inventive concept.

FIG. 15 is a block diagram showing an example of a touchscreen controller 800 according to some embodiments of the inventive concept. Referring to FIG. 15, the touchscreen controller 800 may include a plurality of S/H blocks (e.g., first, second, and third S/H blocks 811, 812, and 813), an ADC 820 shared by the first, second, and third S/H blocks 811, 812, and 813, and a DSP 830 for receiving digital-converted touch inputs.

The first S/H block 811 may sample capacitive touch inputs V1_1 to V1_A, and the second S/H block 812 may sample force touch inputs V2_1 to V2_B. As in the afore-described embodiments, the first S/H block 811 may perform the sampling operation in response to a first sampling signal QS1, and the second S/H block 812 may perform the sampling operation in response to a second sampling signal QS2.

The touchscreen controller 800 may process various signals which are required to be converted into digital signals regardless of a touch sensing operation therein (e.g., another type of inputs V3_1 to V3_C). In this case, the touchscreen controller 800 may use the ADC 820, which is commonly used for capacitive sensing and force sensing, to convert the other type of inputs V3_1 to V3_C into digital signals.

According to some embodiments, the third S/H block 813 may sample the other type of inputs V3_1 to V3_C in response to a third sampling signal QS3. Since the third sampling signal QS3 selectively controls the third S/H block 813, the third sampling signal QS3 may be generated regardless of the first and second sampling signals QS1 and QS2. That is, the third sampling signal QS3 may be asserted while the first and second S/H blocks 811 and 812 are being output. In addition, similarly to the afore-described embodiments, the other type of inputs V3_1 to V3_C may be output to the ADC 820 after the capacitive touch inputs V1_1 to V1_A and the force touch inputs V2_1 to V2_B are provided to the ADC 820.

The other type of inputs V3_1 to V3_C may include various types of signals. For example, the touchscreen controller 800 may detect levels of various internal voltages and, in this case, the various internal voltages to be detected may correspond to the other type of inputs V3_1 to V3_C. In some embodiments, the touchscreen controller 800 may detect levels of various voltages applied to external elements and, in this case, the various external voltages to be detected may correspond to the other type of inputs V3_1 to V3_C. For example, levels of voltages applied to a plurality of channels connected to the touchscreen controller 800 may be detected and, in this case, the voltages applied to the channels may correspond to the other type of inputs V3_1 to V3_C.

In a touchscreen controller, a touchscreen system including the same, and an operating method of the touchscreen controller, according to the inventive concept, the number of ADCs for processing touch inputs based on various touch schemes, and thus the size of a semiconductor chip for implementing the touchscreen controller may be reduced and power consumption may also be reduced.

While the inventive concept has been particularly shown and described with reference to embodiments thereof, it will be understood that various changes in form and details may be made therein without departing from the spirit and scope of the following claims.

What is claimed is:

1. A method comprising:
    sampling a plurality of capacitive touch inputs from a touchscreen and storing samples of the capacitive touch inputs in a first sample-and-hold(S/H) block responsive to a first sampling signal;
    sequentially providing the samples of the capacitive touch inputs stored in the first S/H block to an analog-digital converter (ADC) responsive to first output control signals;
    sampling a plurality of force touch inputs from the touchscreen and storing samples of the force touch inputs in a second S/H block responsive to a second sampling signal; and
    sequentially providing the samples of the force touch inputs stored in the second S/H block to the ADC responsive to second output control signals.

2. The method of claim 1, wherein the first S/H block comprises a plurality of first S/H circuits corresponding to the capacitive touch inputs, wherein the second S/H block comprises a plurality of second S/H circuits corresponding to the force touch inputs, wherein the capacitive touch inputs are simultaneously stored in the first S/H circuits responsive to the first sampling signal and wherein the force touch inputs are simultaneously stored in the second S/H circuits responsive to the second sampling signal.

3. The method of claim 1, wherein the first and second sampling signals are asynchronously generated.

4. The method of claim 1, wherein, during a single sampling cycle, the second sampling signal is asserted while the first output control signals are being sequentially asserted or the first sampling signal is asserted while the second output control signals are being sequentially asserted.

5. The method of claim 1, wherein the second sampling signal is asserted at an arbitrary timing after the first sampling signal is asserted and before the second output control signals are asserted.

6. The method of claim 5, wherein the second S/H block retains the sampled force touch inputs until all of the capacitive touch inputs are provided to the ADC, and provides the force touch inputs to the ADC after all of the capacitive touch inputs are provided to the ADC.

7. The method of claim 1, further comprising amplifying the samples of the stored capacitive touch inputs and the stored samples of the force touch inputs using an amplifier shared by the first and second S/H blocks and providing the amplified samples of the capacitive touch inputs and the amplified samples of the force touch inputs to the ADC.

8. The method of claim 1, further comprising
amplifying the samples of the stored capacitive touch inputs using a plurality of first amplifiers corresponding to a plurality of first S/H circuits in the first S/H block and providing the amplified samples of the capacitive touch inputs to the ADC; and
amplifying the samples of the stored force touch inputs using a plurality of second amplifiers corresponding to a plurality of second S/H circuits in the second S/H block and providing the amplified samples of the force touch inputs to the ADC.

9. The method of claim 1, wherein each of the first and second sampling signals is generated based on one or more types of timing information related to a display driving operation.

10. The method of claim 1, further comprising performing an analog front end (AFE) operation to generate the capacitive touch inputs and the force touch inputs, wherein each of the first and second sampling signals is generated based on timing information related to the AFE operation.

11. A touchscreen controller comprising:
a first sample-and-hold (S/H) block configured to sample a plurality of capacitive touch inputs in response to a first sampling signal and to output samples of the sampled capacitive touch inputs in response to first output control signals;
a second S/H block configured to sample a plurality of force touch inputs in response to a second sampling signal independent of the first sampling signal and to output samples of the sampled force touch inputs in response to second output control signals; and
an analog-digital converter (ADC) shared by the first and second S/H blocks and configured to convert the samples of the capacitive touch inputs and the samples of the force touch inputs into digital signals.

12. The touchscreen controller of claim 11:
wherein the first S/H block comprises a plurality of S/H circuits configured to store samples for respective ones of the capacitive touch inputs; and
wherein the second S/H block comprises a plurality of S/H circuits configured to store samples for respective ones of the force touch inputs.

13. The touchscreen controller of claim 11, further comprising a control signal generator configured to generate the first and second sampling signals, wherein the control signal generator is configured to assert the second sampling signal at an arbitrary timing after the first sampling signal is asserted and before the second output control signals are asserted.

14. The touchscreen controller of claim 13, wherein the control signal generator is configured to assert the second sampling signal while the first output control signals are being sequentially asserted.

15. The touchscreen controller of claim 11, wherein the first S/H block comprises a plurality of S/H circuits configured to store samples for respective ones of the capacitive touch inputs, wherein the second S/H block comprises a plurality of S/H circuits configured to store samples for respective ones of the force touch inputs, wherein the touchscreen controller further comprises an amplifier shared by the first S/H block and the second S/H block and configured to amplify the samples of the capacitive touch inputs and the samples of the force touch inputs and to provide the amplified samples to the ADC.

16. The touchscreen controller of claim 11, further comprising a third S/H block configured to sample a plurality of analog signals in response to a third sampling signal and to output samples of the sampled analog signals in response to third output control signals, wherein the third S/H block sequentially outputs the samples of the analog signals to the ADC in a period when the first and second output control signals are not asserted.

17. A touchscreen system comprising:
a touchscreen panel comprising a plurality of capacitive sensing electrodes configured to sense capacitive touches and a plurality of force sensing electrodes configured to sense force touches; and
a touchscreen controller electrically connected to the capacitive sensing electrodes through a plurality of first channels and to the force sensing electrodes through a plurality of second channels, the touchscreen controller comprising:
a first sample-and-hold (S/H) block configured to generate and store samples of a plurality of capacitive touch inputs received through the first channels responsive to a first sampling signal;
a second S/H block configured to generate and store samples of a plurality of force touch inputs received through the second channels responsive to a second sampling signal;
an analog-digital converter (ADC) shared by the first and second S/H blocks and configured to convert the stored samples of the capacitive touch inputs and the force touch inputs into digital signals; and
a control signal generator configured to generating the first sampling signal and the second sampling signal.

18. The touchscreen system of claim 17, wherein the first S/H block is configured to output the stored samples of the capacitive touch inputs to the ADC responsive to first output control signals, wherein the second S/H block is configured to output the stored samples of the force touch inputs to the ADC responsive to second output control signals, and wherein the control signal generator is further configured to generate the first output control signals and the second output control signals.

19. The touchscreen system of claim 18, wherein the first output control signals may be sequentially asserted after the first sampling signal is asserted, and wherein the second sampling signal is asserted at an arbitrary timing before the second output control signals are asserted.

20. The touchscreen system of claim 17, further comprising a display panel configured to display an image, wherein the touchscreen controller further comprises a timing controller configured to generate timing information related to driving of the display panel and wherein the control signal generator is configured to generate the first and second sampling signals responsive to the timing information.

* * * * *